UNITED STATES PATENT OFFICE.

CHARLES H. WATERS, OF GROTON, MASSACHUSETTS, ASSIGNOR TO THE CLINTON WIRE-CLOTH COMPANY.

IMPROVEMENT IN METHODS OF PAINTING WIRE-CLOTH.

Specification forming part of Letters Patent No. 84,520, dated December 1, 1868; reissue No. 4,463, dated July 4, 1871.

DIVISION B.

*To all whom it may concern:*

Be it known that I, CHARLES H. WATERS, of Groton, county of Middlesex and State of Massachusetts, have invented a new and useful Improvement in Painting Wire-Cloth, of which the following is a description:

Heretofore the painting of wire-cloth has been done by hand, and the process has necessarily been slow and expensive. I have invented an improvement in the art of painting wire-cloth by which it is accomplished better than by hand, and much more rapidly and economically.

My improvement consists in dipping the wire-cloth in a bath of the desired paint, and while it is thus thoroughly coated subjecting the face of the wire-cloth to pressure for pressing or squeezing off the surplus paint which has necessarily been taken up from the bath. By this means a fine smooth surface is given to the painted wire without waste of paint.

There will be found described in the patent No. 84,520, dated December 1, 1868, granted to my assignee, The Clinton Wire-Cloth Company, for machine for painting wire-cloth, (of the reissue of which patent this present application is one division,) a suitable apparatus for carrying out my improvement in the art of painting wire-cloth; but I wish it to be understood that I do not confine myself to the use of any particular apparatus for the purpose, as my improvement may be practiced by the use of various apparatus of different constructions performing the operations in which I have above stated my improvement to consist; but

I claim—

As an improvement in the art of painting wire-cloth, dipping it into a bath of paint to fully cover all parts of its surface with the paint, and then subjecting the face of the cloth to pressure to squeeze or press off the surplus paint, substantially as described.

C. H. WATERS.

Witnesses:
N. AUSTIN PARKS,
J. HENRY TAYLOR.